United States Patent [19]
Dvorkis et al.

[11] Patent Number: 5,714,746
[45] Date of Patent: *Feb. 3, 1998

[54] TERMINAL WITH SLIM SCAN MODULE WITH GENERALLY ORTHOGONAL CIRCUIT BOARD ARRANGEMENT

[75] Inventors: Paul Dvorkis, Stony Brook; David Tsi, Centereach; Howard Shepard, Great River, all of N.Y.

[73] Assignee: Symbol Technologies, Inc., Holtsville, N.Y.

[*] Notice: The term of this patent shall not extend beyond the expiration date of Pat. No. 5,367,151.

[21] Appl. No.: 810,524

[22] Filed: Mar. 3, 1997

Related U.S. Application Data

[62] Division of Ser. No. 607,043, Feb. 26, 1996, abandoned, which is a division of Ser. No. 315,178, Sep. 29, 1994, Pat. No. 5,552,592, which is a continuation-in-part of Ser. No. 952,414, Sep. 29, 1992, Pat. No. 5,367,151, which is a continuation-in-part of Ser. No. 943,232, Sep. 10, 1992, Pat. No. 5,373,148, and a continuation-in-part of Ser. No. 789,705, Nov. 8, 1991, Pat. No. 5,412,198, which is a continuation-in-part of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.⁶ .................................................. G06K 7/10
[52] U.S. Cl. ..................... 235/472; 235/462; 359/213; 359/224
[58] Field of Search .......................... 235/472, 462, 235/454, 467, 470; 359/213, 224

[56] References Cited

U.S. PATENT DOCUMENTS

| | | | |
|---|---|---|---|
| Re. 28,285 | 12/1974 | Schanne | 235/454 X |
| 3,076,957 | 2/1963 | Hankes et al. | 340/173 |
| 3,229,075 | 1/1966 | Palti | 350/96.1 |
| 3,622,758 | 11/1971 | Schanne | 235/454 X |
| 3,665,164 | 5/1972 | Beveridge et al. | 235/472 |
| 3,676,645 | 7/1972 | Fickenscher et al. | 235/454 X |
| 3,685,723 | 8/1972 | Berler | 235/472 |
| 3,699,312 | 10/1972 | Jones et al. | 235/472 |
| 3,725,894 | 4/1973 | Geisler | 235/383 X |
| 3,728,677 | 4/1973 | Munson | 340/146.3 F |
| 3,735,096 | 5/1973 | Knockeart et al. | 235/472 |
| 3,748,014 | 7/1973 | Beiser | 350/7 |
| 3,780,271 | 12/1973 | Sharkitt et al. | 235/454 X |
| 3,812,325 | 5/1974 | Schmidt | 235/465 |
| 3,812,347 | 5/1974 | Cunningham et al. | 235/454 X |
| 3,812,374 | 5/1974 | Tuhro | 250/568 |
| 3,826,900 | 7/1974 | Moellering | 235/472 |
| 3,881,802 | 5/1975 | Helava | 350/6.4 |
| 3,902,048 | 8/1975 | Fleischer et al. | 235/454 |
| 3,916,158 | 10/1975 | Sansone et al. | 235/454 |
| 3,947,816 | 3/1976 | Rabedeau | 235/454 X |
| 3,964,022 | 6/1976 | Martin | 235/472 X |
| 3,976,973 | 8/1976 | Martin et al. | 235/472 X |
| 3,991,883 | 11/1976 | Hobler et al. | 209/73 |
| 3,992,623 | 11/1976 | Rhyins et al. | 250/235 X |
| 4,007,377 | 2/1977 | Simon et al. | 235/454 X |
| 4,011,435 | 3/1977 | Phelps et al. | 235/454 X |
| 4,019,026 | 4/1977 | Nakanishi et al. | 235/454 |
| 4,020,357 | 4/1977 | Punis | 250/568 |
| 4,025,761 | 5/1977 | Hayosh et al. | 235/472 X |
| 4,059,225 | 11/1977 | Maddox | 235/437 |
| 4,088,981 | 5/1978 | Gott | 340/146.3 |
| 4,128,298 | 12/1978 | McMillan | 235/473 X |
| 4,210,802 | 7/1980 | Sakai | 235/483 |
| 4,271,706 | 6/1981 | Ledley | 73/614 |
| 4,289,957 | 9/1981 | Neyroud et al. | 235/462 |
| 4,406,542 | 9/1983 | Biggy et al. | 356/345 |
| 4,571,595 | 2/1986 | Phillips et al. | 343/745 |
| 4,897,532 | 1/1990 | Swartz et al. | 235/467 |
| 4,906,843 | 3/1990 | Jones et al. | 235/449 X |
| 5,367,151 | 11/1994 | Dvorkis et al. | 235/472 |

*Primary Examiner*—Donald T. Hajec
*Assistant Examiner*—Michael G. Lee
*Attorney, Agent, or Firm*—Kirschstein, et al.

[57] ABSTRACT

A compact scan module is mounted within a hand-held terminal, and includes two printed circuit boards orthogonal to each other. The circuit boards carry interconnected electrical circuits which drive individual electrical components within the module. Scanning is initiated by an initiator on the terminal. A keyboard and a display are mounted on the terminal.

14 Claims, 10 Drawing Sheets

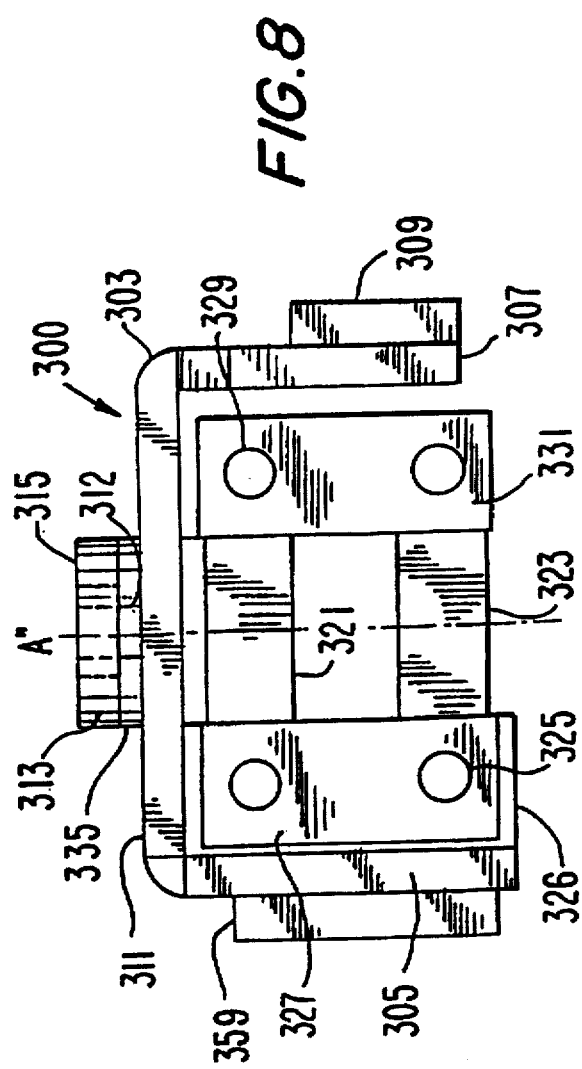
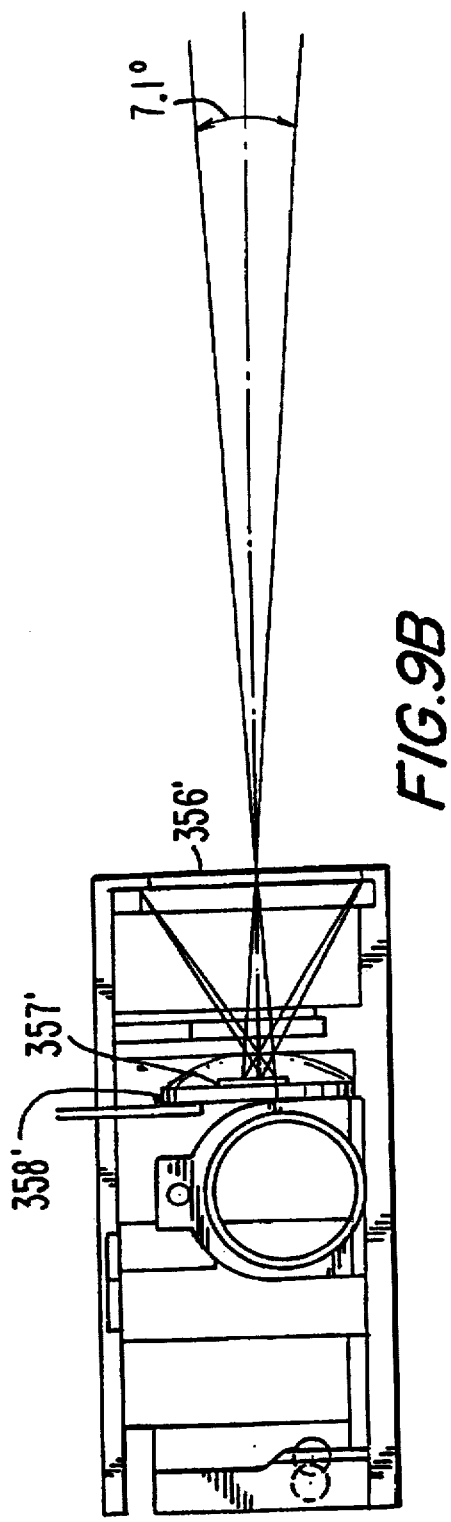

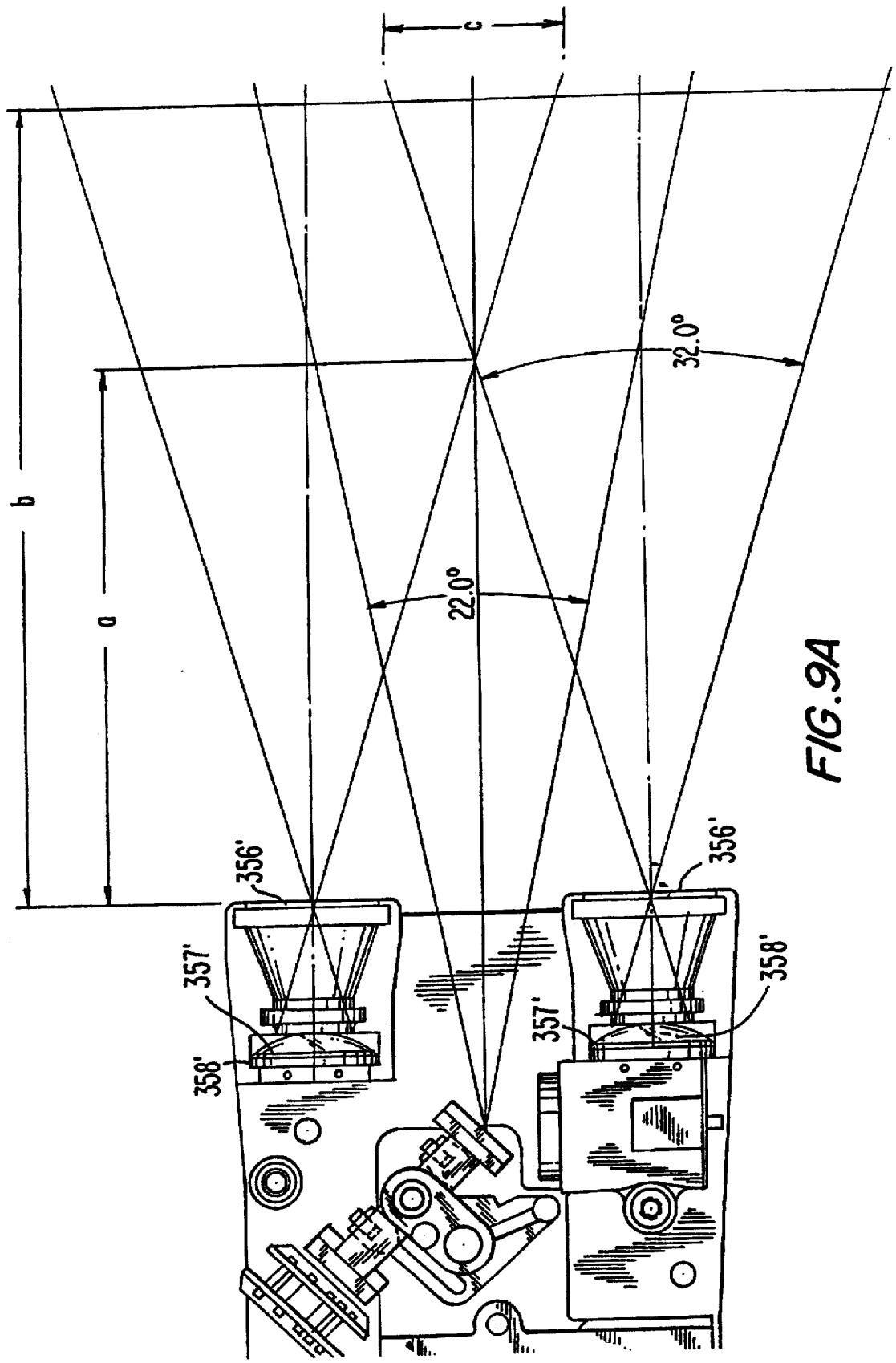

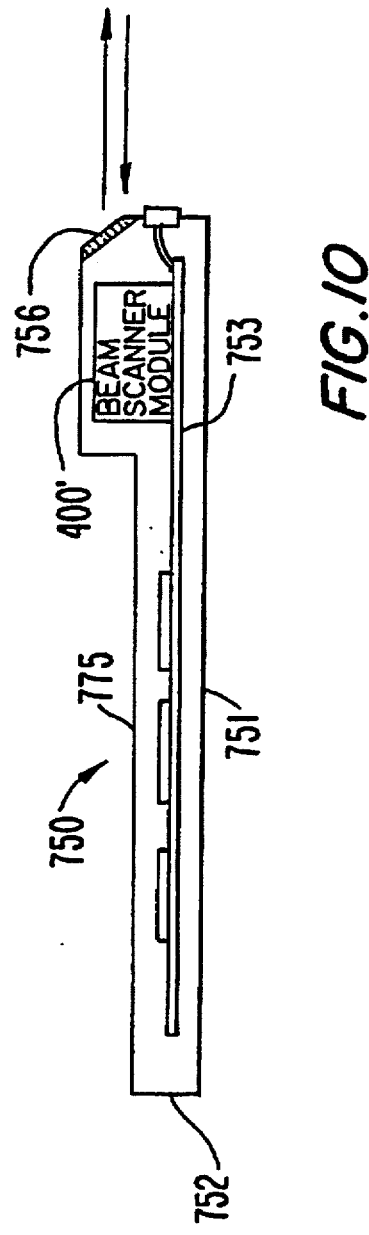
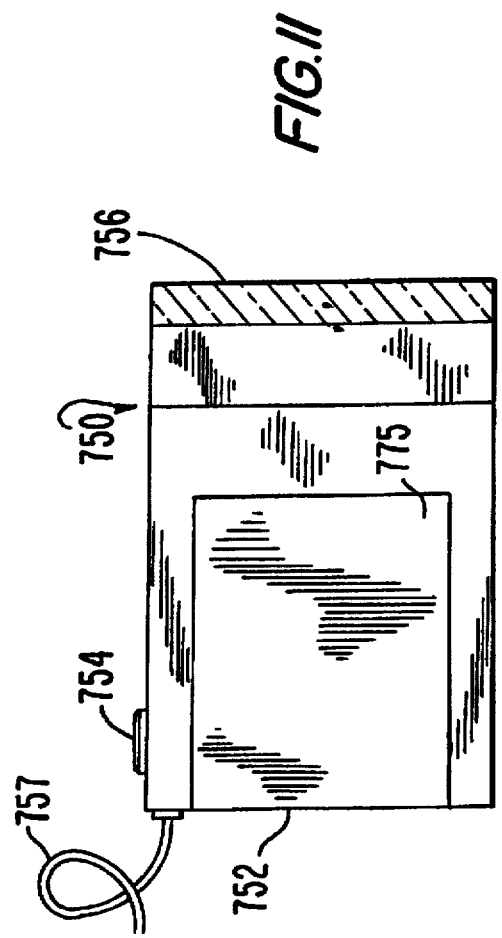

TERMINAL WITH SLIM SCAN MODULE WITH GENERALLY ORTHOGONAL CIRCUIT BOARD ARRANGEMENT

CROSS-REFERENCE TO RELATED APPLICATIONS

This application is a division of application Ser. No. 08/607,043, filed Feb. 26, 1996, now abandoned, which is a division of Ser. No. 08/315,178, filed Sep. 29, 1994, now U.S. Pat. No. 5,552,592, which is a continuation-in-part of Ser. No. 07/952,414, filed Sep. 29, 1992, now U.S. Pat. No. 5,367,151, which is a continuation-in-part of Ser. No. 07/943,232, filed Sep. 10, 1992, now U.S. Pat. No. 5,373,148, and of Ser. No. 07/789,705, filed Nov. 8, 1991, now U.S. Pat. No. 5,412,198, the latter of which is a continuation-in-part of Ser. No. 07/520,464, filed May 8, 1990, now U.S. Pat. No. 5,168,149, which is a continuation-in-part of Ser. No. 07/428,770, filed Oct. 30, 1989, now U.S. Pat. No. 5,099,110. Each of the above-identified applications is incorporated herein by reference.

TECHNICAL FIELD

This invention relates to optical scanning devices, such as bar code scanners, and more particularly to an improved mid-range and long-range modular scanner which utilizes laser scanning and is particularly suitable for use in applications requiring optical scanners with small, light weight scanning components.

BACKGROUND

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information.

A bar code reader illuminates the code and senses light reflected from the code to detect the widths and spacings of the code symbols and derive the encoded data. These widths and spacings determine the density of the symbol. The denser the symbol, the greater the information which can be encoded within a particular area i.e. within the area of a symbol of a particular size. Symbols with bars and spaces of a width less than 7.5 mils, and more particularly in a range between 5.5 and 7.5 mils are generally considered to be high density symbols. Symbols having bars and spaces of widths over 10 mils are generally considered low density symbols. Accordingly, symbols with bar and space widths over 7.5 mils and up to 10 mils are considered medium density symbols. Optical scanning devices are often characterized on the basis of the density of the symbol which can be read within a particular range of distances to the indicia.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate.

A variety of scanning devices are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, e.g., bar code symbols, particularly of the Universal Product Code (UPC) type, at a certain working range or reading distance from a hand-held or stationary scanner.

FIG. 1 illustrates an example of a prior art bar code reader unit 10 implemented as a gun shaped device, having a pistol-grip type of handle 53. A lightweight plastic housing 55 contains the laser light source 46, the detector 58, the optics and signal processing circuitry and the CPU 40, as well as a power source or battery 62. A light-transmissive window 56 in the front end of the housing 55 allows the outgoing light beam 51 to exit and the incoming reflected light 52 to enter. The user aims the reader 10 at a bar code symbol 70 from a position in which the reader 10 is spaced from the symbol, i.e., not touching the symbol or moving across the symbol.

As further depicted in FIG. 1, the reader 10 may include a suitable lens 57 (or multiple lens system) to focus the scanned beam into a scanning spot at an appropriate reference plane. The light source 46, such as a semiconductor laser diode, introduces a light beam into the axis of the lens 57, and the beam passes through a partially-silvered mirror 47 and other lenses or beam-shaping structures as needed. The beam is reflected from an oscillating mirror 59 which is coupled to a scanning motor 60 which is energized when the trigger 54 is pulled. The oscillation of the mirror 59 causes the reflected beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively and reciprocally driven in alternate circumferential directions about a drive shaft on which the multi-mirror construction is mounted.

The light 52 reflected back by the symbol 70 passes back through the window 56 for application to the detector 58. In the exemplary reader 10 shown in FIG. 1, the reflected light reflects off of mirror 59 and partially-silvered mirror 47 and impacts on the light sensitive detector 58. The detector 58 produces an analog signal proportional to the intensity of the reflected light 52.

A digitizer circuit mounted on board 61 processes the analog signal from detector 58 to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder, typically a programmed microprocessor 40 which will have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

To scan a symbol 70, a user aims the bar code reader unit 10 and operates movable trigger switch 54 to activate the light beam 51, the scanning motor 60 and the detector circuitry. If the scanning beam is visible, the operator can see the scan pattern on the surface on which the symbol appears and adjust aiming of the reader 10 accordingly. If the light produced by the source 46 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

The reader 10 may also function as a portable computer terminal. If so, the bar code reader 10 would include a keyboard 48 and a display 49, such as described in the previously noted U.S. Pat. No. 4,409,470.

In optical scanners of the type discussed above, the laser diode, the lens, the mirror and the means to oscillate the mirror all add size and weight to the handheld scanner. The photodetector and the associated processing circuitry also add size and weight. In applications involving protracted use, a large heavy handheld unit can produce fatigue. When use of the scanner produces fatigue or is in some other way inconvenient, the user is reluctant to operate the scanner. Any reluctance to consistently use the scanner defeats the data gathering purposes for which bar code systems are intended.

The distance from which a scanner can read indicia may affect its usefulness. For example, it is often desirable for a user to scan indicia from long range, say up to five plus feet from the symbol for low density symbols. For high density symbols it is desirable if the user can read the symbol at no less than six plus inches from the target. However, signal to noise ratios at these ranges, have previously made it difficult to read high density symbols, for example those with bar/space widths of 5.5 to 7.5 mils or to read even low density symbols such as those with bar/space widths of 10 mil or more at such ranges, without paying a significant price in terms of the size, weight, operational life between recharging or changing the power supply, and hence in terms of the portability and operability, of the scanner.

It is beneficial to modularize scanning components, so that a particular module can be used in a variety of different scanners. A particularly small, light weight module which contains all necessary scanner components would be particularly beneficial since this would allow all necessary components to be easily replaced by removing and installing a single small module.

Smaller size scanning components tend to operate at higher scanning frequencies. In typical bar code scanning applications, however, the scanning frequency of the moving spot should be relatively low, typically 20 Hz or less. If the frequency increases, the speed of the spot as it passes over the indicia increases. The signals produced by the detector also increase in frequency, and consequently the bandwidth of the processing circuitry for analyzing the detector signals must be increased. Also, operation at higher scanning frequencies generally produces detector signals which include higher levels of noise, making accurate decoding more difficult.

OBJECTS OF THE INVENTION

Thus, an ongoing objective of bar code reader development is to miniaturize the bar code reader as much as possible, and it is an object of the present invention to further reduce the size and weight of the scan unit and to provide a particularly convenient scanner system.

It is another objective of the present invention to provide an entirely self-contained scanning module, including all components necessary to generate the light beam, scan the beam in a pattern across an indicia, detect light reflected back by the indicia and process signals representative of the reflected light.

It is a further objective of the present invention to provide a self contained scanning module which is small, light weight and easy to incorporate into a variety of different types of optical scanners and optical scanning systems.

It is yet another object of the present invention to provide a mid-range and long-range scanner which requires less power and is smaller, lighter in weight, and has a longer operational life between recharging or changing the power supply, and hence has improved portability and operability.

It is still another object of the present invention to provide a mid-range and long-range scanner which can read high density symbols at mid-range and lower density symbols at long range.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF INVENTION

In a first embodiment of the present invention, an optical scanning system for scanning indicia, such as bar codes, having portions of differing light reflectivity is provided. The system includes a light emitter assembly having a single light source, preferably a laser diode, for emitting a beam of light towards the indicia such that the beam of light scans, preferably forming a single line scan, across said indicia. First and second optical detectors respectively receive light reflected back from first and second portions of the indicia. Each optical detector includes a photodetector, which is preferably a single or linear photodiode, a lens, such as a Fresnel lens, and an aperture, such as a elongated thin-slit aperture, which is disposed between the photodetector and lens.

Beneficially, the reflected light from the first and second portions of the indicia is simultaneously received by the respective detectors. It is also beneficial for the first and second optical detectors to simultaneously produce respective first and second electrical signals corresponding to the differing light reflectivity of the first and second portions of the indicia. The system is capable of reading high density indicia having bar/space widths in the range of 5.5 to 7.5 mils at a distance of 6.6 to 12.75 inches and lower density indicia having bar/space widths of over 10 mils at a distance of 12.75 to 68 inches.

According to other aspects of the first embodiment of the invention, the first portion of the indicia reflects light from only a first portion of the scan line, which is preferably half of the scan line. The second portion of the indicia reflects light from only a second portion of the scan line, which is preferably the other half of the scan line. A first circuit may be provided for linearly stitching together or summing first and second analog signals corresponding to the electrical signals generated by the optical detectors to produce a single analog signal representative of the full indicia.

According to still further aspects of the first embodiment of the invention, a base, preferably made of metal, is provided to support the light emitter and optical detectors. A first circuit board mounted orthogonal to and at one end of the base has a first circuit mounted to it. The first circuit may include a drive circuit for producing a signal to drive the emitter. A second circuit board, having a second circuit, is mounted orthogonal to the first circuit board and parallel to the base. The second circuit may include an application specific integrated circuit for processing electrical signals produced by the first and second optical detectors. An electrical cable, which is preferably flexible, connects the first and second circuits to each other. Accordingly, the first and second circuits can operate together to produce signals to drive the emitter and to process electrical signals produced by the first and second optical detectors. A portion of the metal base may form a heat sink for dissipating heat generated by the laser diode during operation of the system.

According to a second embodiment of the invention, a self-contained optical scanning module is provided for reading indicia having portions of differing light reflectivity. The module includes a base, which is preferably made of metal, and an emitter for emitting a beam of light. The emitter preferably has a laser diode and is fixedly mounted on the base. A mirror or other optical device directs the beam of light toward the indicia. The optical device is mounted for oscillatory movement on a support structure attached to the base. A scan motor is provided for producing reciprocal motion of the optical device while it is supported by the support structure such that the beam of light scans, preferably in a single line scan, across the indicia. First and second optical detectors respectively receive light reflected back from first and second portions of the indicia and each produce electrical signals corresponding to the differing light reflectivity of a respective portion of the indicia. Each detector preferably includes a photodiode and a lens and an aperture located between the lens and photodiode. A first circuit board, having a first circuit, is mounted orthogonal to and at one end of the base. The first circuit includes a drive circuit for producing a signal to drive the emitter. A second circuit board, having a second circuit, is mounted orthogonal to the first circuit board and parallel to the base. The second circuit includes an application specific integrated circuit for producing the signals to drive the scan motor and for processing the electrical signals produced by the detectors. An electrical cable, which is preferably flexible, connects the first and second circuits to each other. This facilitates the conjunctive operation of the first and second circuits to produce signals to drive the emitter and scan motor, and to process the electrical signals produced by the first and second detectors.

A portion of the metal base may serve as a heat sink for dissipating heat generated by the laser diode during operation of the scanning module. The scan motor preferably includes first and second magnets one of which is a permanent magnet and the other of which is an electromagnet to which an alternating drive signal is applied. The first magnet is fixedly coupled to the optical device. The second magnet is mounted on the second circuit board in a position in close proximity to the first magnet, such that application of an alternating drive signal to the electromagnet produces a magnetic field which acts on the permanent magnet to produce reciprocal movement of the optical device. The module, including all components, may be housed in a scanner housing.

According to other aspects of this embodiment of the invention, the support structure has a member with a first end to which the optical device is attached and an opposite end to which the magnet is attached. The optical device, the member and the magnet are dimensioned such that the weight of the magnet balances the weight of the optical device with respect to an axis approximately half way between the mirror and magnet. A flexible planar spring, preferably made of a pair of flexible plastic strips, such as MYLAR(TM) strips, has a free end fixedly coupled to one of the ends of the member. The flexible planar spring is longer than the distance between one end of the member and the axis but shorter than the distance between the two ends of the member. This facilitates the planar spring flexing about the axis. The base fixedly supports an opposite end of the flexible planar spring. Preferably, the magnet is a permanent magnet which is driven by an electromagnet attached to the second circuit board. To fixedly support the opposite end of the flexible planar spring a pedestal attached to the base may be provided. The pedestal has an arm extending parallel to the base. A plate is attached to the arm of the pedestal. The opposite end of the flexible planar spring is clamped between the plate and the arm of the pedestal.

According to a third embodiment of the present invention, an optical scanning system has an optical emitter for emitting a beam of light. The emitter includes a component for directing the beam of light toward the indicia. The emitter component is attached to a first end of a member. An opposite end of member is attached to a magnet. The component, the member and the magnet are dimensioned such that the weight of the magnet balances the weight of the component with respect to an axis approximately half way between the component and magnet. The member is mounted for rotational oscillation about the axis on a support which facilitates reciprocal motion. A drive produces an oscillating force on the magnet such that the member oscillates about the axis and the component reciprocates through an arc about the axis, thereby causing the beam of light to scan across the indicia. First and second optical detectors respectively receive light reflected back from first and second portions of the indicia. Each detector produces electrical signals corresponding to the differing light reflectivity of a respective portion of the indicia.

The reciprocal support preferably includes a flexible planar spring, which is preferably formed of a pair of flexible plastic strips, of the type previously described, and has a fixed end and a moveable end. The moveable end is fixedly coupled to one of the ends of the member. The flexible planar spring is longer than the distance between one end of the member and the axis but shorter than the distance between the first and second ends of the member.

The member is preferably U-shaped and has a first arm to which the emitter component is attached. A second arm is attached to the magnet. A substantially straight section extends between and connects the first and second arms. The flexible arms are substantially parallel to each other. The flexible planar spring extends in a direction substantially parallel to the substantially straight section of the U-shaped member when the flexible planar spring is in its rest state. If desired, a substantially straight member could be extended directly between the magnet and the component. In such a case, the flexible planar spring would extend in a direction substantially parallel the straight member when the flexible planar spring is in its rest state.

According to further aspects of the third embodiment of the invention, the drive includes a stationary second magnet, preferably concentric about but spaced from the straight section or member at a position intermediate the emitter component and the magnet attached to the second end of the member or arm. One of the magnets is a permanent magnet, and the other is an electromagnet. An alternating drive signal is applied to the electromagnet to produce a magnetic field which acts on the permanent magnet to cause reciprocal movement of the member. The stationary magnet is mounted at a fixed position in proximity to the magnet attached to the second end of the member.

According to the method of the present invention, optical scanning of indicia having portions of differing light reflectivity is performed by emitting a beam of light towards the indicia, such that the beam of light scans, preferably as a single line scan, across the indicia. Light reflected back from first and second portions of the indicia is respectively detected. The reflected light is passed through a lens and an aperture prior to detection.

Preferably, reflected light from the first and second portions of the indicia is simultaneously detected. First and second electrical signals, respectively corresponding to the differing light reflectivity of the first and second portions of the indicia, are produced. First and second analog signals corresponding to the first and second electrical signals can be linearly stitched together or summed to generate a single analog signal representative of said indicia. Using the method high density indicia having bar/space widths in the range of 5.5 to 7.5 mils and separated from the lens by 6.6 to 12.75 inches can be read. Low density indicia having bar/space widths of over 10 mils and being separated from the lens by 12.75 to 68 inches may also be read using this method.

According to other aspects of the inventive method, reflected light is detected from the first portion of the indicia by detecting only the reflection of light from a first portion of the scan line off the indicia. Likewise, the detection of reflected light from the second portion of the indicia is accomplished by detecting only the light from the second portion of the scan line which is reflected off the indicia. Preferably, the first portion of the scan line and the second portion of the scan line each include a common portion of the scan line.

BRIEF DESCRIPTION OF DRAWINGS

FIG. 8 is a side view of the mirror and magnet support structure of the scanning module of FIGS. 4 to 7.

FIGS. 9A and 9B illustrate the inter-relation of the two detector assemblies of the scanner module of FIGS. 4–7 in accordance with the present invention.

FIG. 10 illustrates in cross section an electronic terminal incorporating a beam scanner module of the present invention.

FIG. 11 is a top view of the electronic terminal of FIG. 10.

BEST MODES FOR CARRYING OUT THE INVENTION

As used in this specification and in the appended claims, the term "indicia" broadly encompasses not only symbol patterns composed of alternating bars and spaces of various widths commonly referred to as bar code symbols, but also other one or two dimensional graphic patterns, as well as alphanumeric characters. In general, the term "indicia" may apply to any type of pattern or information which may be recognized or identified by scanning a light beam and detecting reflected or scattered light as a representation of variations in light reflectivity at various points of the pattern or information. A bar code symbol is one example of an "indicia" which the present invention can scan.

The preferred embodiments of the invention discussed below will use a mirror as the scanning component which moves to produce the desired scanning motion of the beam spot over the indicia, however, other optical components could be moved. For example, the flexible support structure could support a light emitter (e.g. a laser diode) or an objective focusing lens for reciprocal motion.

Figure 2:
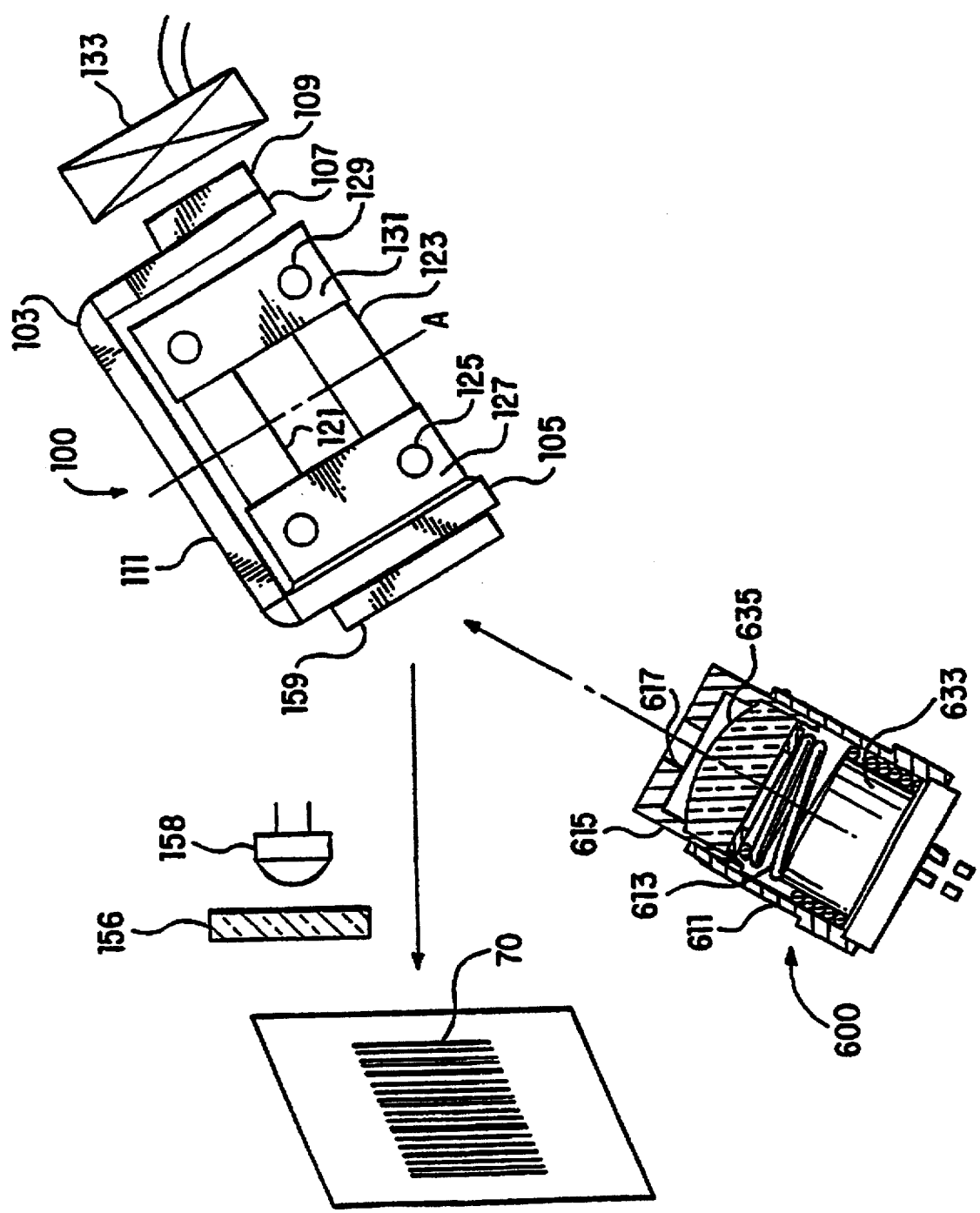
FIG. 2 shows the layout of a scan motor utilized in the scanner module of the present invention for producing a horizontal scan line.
Figure 3:
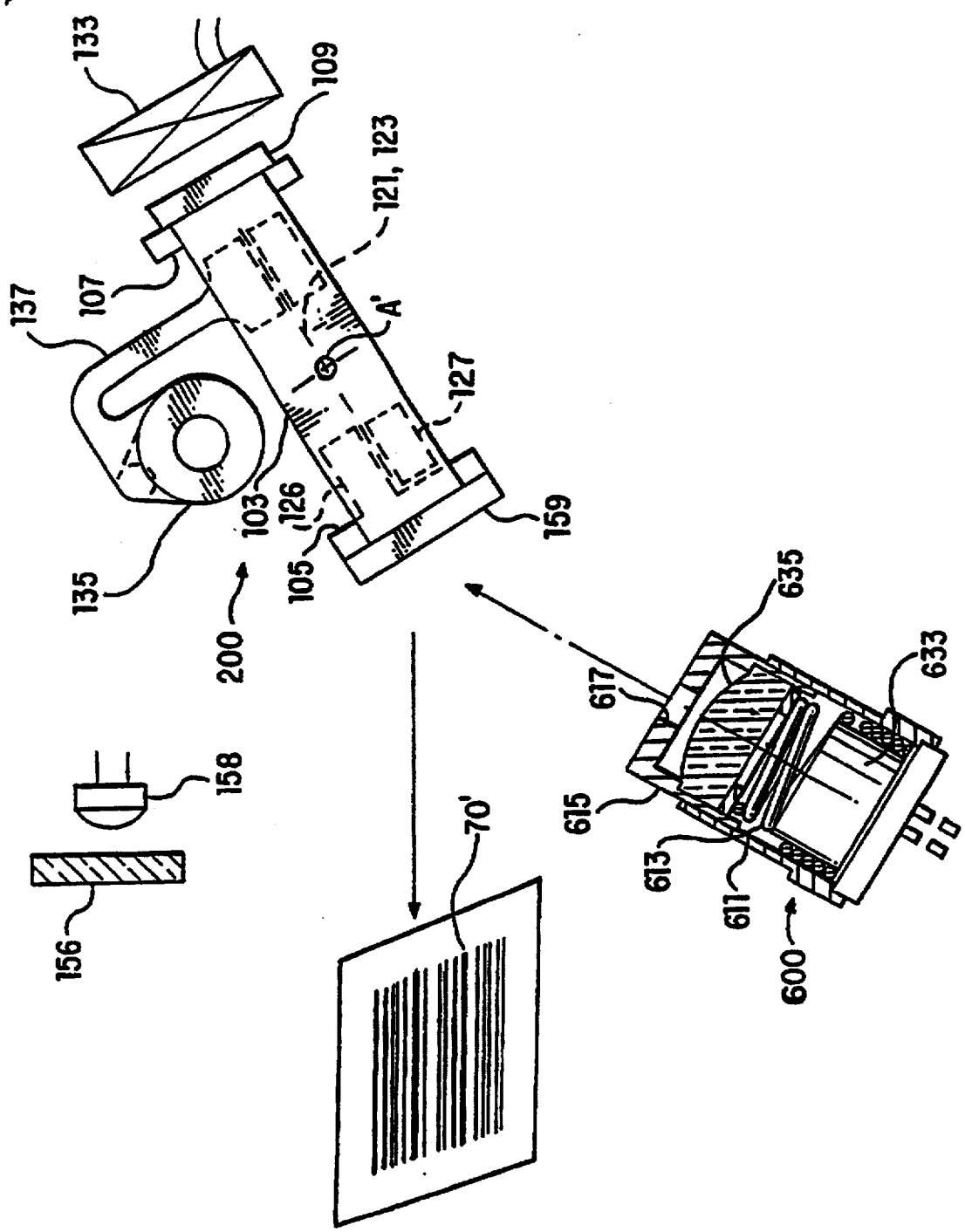
FIG. 3 shows the layout of a scan motor utilized in the scanner module of the present invention, which is similar to that of FIG. 2, but with the scanning mirror supported for motion in a direction which will produce a vertical scan line.

FIGS. 2 and 3 show layouts of scanner motors including flexible support structures for providing reciprocal motion of a mirror, which can be utilized in the scan module of the present invention. The illustrated systems are essentially similar, and these drawings use the same reference numerals to identify corresponding components of each system. Comparison of the two drawings, however, highlights a key feature of the scanner motor. The basic flexible support structure supporting the scanning mirror can be oriented in any way desired to provide a desired orientation of the resulting scanning line. As explained in more detail below, the layout of FIG. 2 will produce a scan line to the left of the drawing substantially perpendicular to the plane of the drawing figure. In contrast, the system shown in FIG. 3 produces a scan line to the left of the drawing which lies substantially in the plane of the drawing figure.

As shown in FIG. 2, a laser diode and focusing module 600 produces a beam of light. Krichever et al., in their U.S. Pat. No. 4,923,281, disclose one example of a laser diode and optics module suitable for use as the module 600. Using the Krichever et al. implementation, the module 600 includes a visible laser diode (VLD) 633, such as a TOLD9201.138 manufactured by Toshiba. A lens 635 focuses the beam from the laser diode 633, as necessary, to prepare the beam for transmission to the mirror 159. The module has two telescoping holding members 611 and 615, and a biasing spring 613 positioned between the laser diode 633 and the lens 635. One holding member 611 is attached to the laser diode 633, and the other member 615 holds the lens 635. The second holder 615 also provides an aperture 617 for the light passing through the lens 635. Typically, the module 600 is assembled and focused properly for a particular application prior to incorporation of the module into the scanner system.

When current is applied to drive laser diode 633, the beam from the diode passes through the lens 635 and aperture 617 and impacts on a reflective surface of the mirror 159. The mirror 159 redirects the beam toward the target surface on which the coded indicia 70 appears. The mirror 159 also serves as a scanning component which moves so that the beam spot scans a line or pattern across the target surface.

A support structure 100 provides flexible support for the mirror 159 so as to permit the necessary reciprocal motion of the mirror. As shown in FIG. 2, the mirror support structure 100 includes U-shaped member 103. The member 103 has a first arm 105, at one end, to which the mirror 159 is attached. A second arm 107 of the member 103 supports a first magnet, in this case a permanent magnet 109. A straight section 111 extends between and connects the first and second arms together to form the U-shape of member 103. Typically, the member 103 is formed of a rigid plastic material.

A pair of flexible strips 121, 123 form a planar spring connected to one of the arms of the U-shaped member 103. The drawings show a pair of strips, but the planar spring could comprise a single flexible strip or more than two flexible strips. In the preferred form, the flexible strip(s) each comprise MYLAR(TM) or KAPTON(TM) film, but other flexible elements could be used such as a flat strip of non-magnetic metal like a beryllium-copper alloy. When in the rest position, the strips 121, 123 remain in a relatively unflexed state and extend in a direction substantially parallel to the straight section 111 in the space between the first arm 105 and the second arm 107. The planar spring or flexible strip(s) are not as long as the straight section 103 or the distance between the mirror 159 and the magnet 109. In the system of FIG. 2, the free ends of the strips connect to the first arm 105, but the strips could easily connect to the second arm 107. The opposite ends of the strips 121, 123 are held by a fixed support structure.

More specifically, the free end of the MYLAR(TM) or KAPTON(TM) material sheets forming the flexible strips 121, 123 are fastened by suitable fasteners 125 (pins, rivets, screws, or the like) and thereby clamped between a plate 127 and a frame member extending from the rear surface of first arm 105 (located below the plate 127 and not substantially visible in FIG. 2). The opposite ends of the strips 121, 123 are fastened to a fixed support structure by suitable fasteners 129 and thereby clamped between a plate 131 and a support pedestal extending upward from a base (not shown) on which the system is mounted. The support pedestal is located below the plate 131 and is not visible in FIG. 2.

As shown, the member 103 extends from a point at which the free ends of the planar springs 121, 123 are attached to a point beyond where the opposite ends of the planar springs are fixedly attached to the support pedestal by fasteners 129 and plate 131. In the illustrated example, the mirror 159 is adjacent to the free ends of the planar spring 121, 123; and the member 103 supports the magnet 109 at a point beyond the fixed ends of the planar springs 121, 123. The components of the support structure 100, the mirror 159 and the magnet 109 are dimensioned such that the weight of the magnet balances the weight of the mirror with respect to an axis A approximately half way between the mirror and the magnet. The strips 121, 123 extend from the connection thereof to the arm 105 to the fixed point located between the axis A and the other arm 107. This means that the flexible strips 121, 123 are longer than the distance between the arm 105 and the axis A, or longer than half the distance between the mirror 105 and the magnet 109. As a result, the strips 121, 123 function as planar leaf spring elements and flex about the pivotal axis A. Vibration of the U-shaped member as supported on the springs 121, 123 produces reciprocal movement of the mirror 159 back and forth through an arc about the axis A. The arc is perpendicular to the plane of the drawing.

A second magnet, in this case electromagnet 133, is attached to the base (not shown) at a position in close proximity to the permanent magnet 109. Electrical input leads carry an energizing current or drive signal to the coil of electromagnet 133. Together, the first and second magnets 109, 133 produce the motive force necessary to cause the vibration of the member 103 about the axis A and the corresponding reciprocal motion of the mirror 159.

The permanent magnet 109 is aligned so that the axis between its north and south poles is substantially perpendicular to the axis A and perpendicular to the axis of the coil of the electromagnet 133. For example, the axis of magnet 109 could be perpendicular to the plane of FIG. 2, and the axis of the coil would be in the plane of the drawing.

When a current is introduced through the coil of the electromagnet 133, interaction between magnetic fields of the coil and the permanent magnet 109 creates a torque causing the magnet 109 (with the attached second end of the member 103) to move from an equilibrium position. With the arrangement illustrated in FIG. 2, this interaction of the magnetic field of the coil with that of the permanent magnet creates torque tending to force the axis of magnet 109 in line with the axis of coil 133. This torque causes the member 103 to rotate about the axis A provided by the planar spring formed by flexible strips 121, 123. The springs 121, 123 supporting the first arm 105 of the member 103 twist or bend about the axis A and produce a return force. This return force is trying to bring the permanent magnet 109 back to the rest position. Reversing the polarity of the applied current will reverse the directions of the magnetic force and the opposing return force. Therefore, if the current applied to the coil of the electromagnet 133 takes the form of a cyclical AC signal, such as a sine wave, a pulse signal, a triangular wave, etc., the induced magnetic forces will produce an oscillatory movement of the permanent magnet 109 and rotational oscillation of the attached member 103. The flexible strip(s) twist back and forth about the axis A causing the member 103 to vibrate, and the mirror 159 reciprocates through the arc about the axis A. The arc of the mirror movement will pass back and forth through the plane of drawing FIG. 2.

Instead of using an alternating drive current, it is possible to use a pulse or half-wave signal at the same frequency and in phase with the characteristic vibration of the spring. The spring forces would produce an ongoing vibration, and the magnetic forces produced by the drive current would replace any mechanical energy lost by the vibration to thereby sustain the vibratory spring motion. The circuitry for producing this type of drive current may be easier to implement than the circuitry for generating the alternating type drive signal.

When the laser diode and focusing module 600 emits a light beam, the moving mirror 159 reflects the beam toward a target surface on which an indicia 70 appears. The reciprocal vibration of the mirror 159 causes the beam to scan a line to the left of the support structure 100 shown in the drawing. If FIG. 2 is a side view and the support structure 100 is oriented as shown, the resultant scan line would be horizontal and would scan an indicia 70 having vertical bars. The light reflected back by the indicia passes back through an ambient light blocking optical filter 156 for application to the detector 158. The detector 158, typically a photodiode, produces an analog signal proportional to the intensity of the reflected light which is processed, digitized and decoded in the usual manner.

FIG. 3 shows a scanning system similar to that of FIG. 2, but with a different orientation of the planar spring members to provide scanning in a different direction. Again, a laser diode and focusing module 600 produces the beam of light when current is applied to drive the laser diode 633. The mirror 159 redirects the beam toward the target surface and moves to provide the motion of the beam spot in a line or pattern across the target surface.

A support structure 200 provides flexible support for the mirror 159 so as to permit the necessary reciprocal motion of the mirror about an axis A' which is perpendicular to the plane of the drawing. In FIG. 3, the mirror support structure 200 includes U-shaped member 103 identical to that used in FIG. 2.

The free ends of the pair of flexible strips 121, 123 which form the planar spring are clamped between a plate 127 and a frame member 126 extending from the rear surface of first arm 105 by suitable fasteners (not visible in FIG. 3). A pedestal 135 is attached to a circuit board or metal sheet which forms a base for the system. The pedestal 135 has a stationary arm 137 which extends to a point within the U of the member 103 at a point between the axis A' and one of the arms, in this case between the axis and the second arm 107. In this embodiment, the opposite ends of the strips 121, 123 are clamped between an enlarged end of the stationary arm 137 and the plate 131 by suitable fasteners (not shown).

The components of the support structure 100, the mirror 159 and the magnet 109 are dimensioned such that the weight of the magnet balances the weight of the mirror with respect to an axis A' approximately half way between the mirror and the magnet in essentially the same manner as in the previous embodiment. As a result, the strips 121, 123 function as a planar leaf spring and flex about the perpendicular pivotal axis A'.

The first and second magnets 109 and 133 function essentially as they did in FIG. 2. Because of the orientation of the support structure 200 shown in FIG. 3, however, the magnet now has the axis between its north and south poles aligned in the plane of the drawing. When the alternating current is introduced through the coil of the electromagnet 133, interaction between magnetic fields of the coil and the permanent magnet 109 produce an oscillatory movement of the permanent magnet 109 and rotational oscillation of the attached member 103. The flexible strip(s) twist back and forth about the axis A' causing the member 103 to vibrate, and the mirror 159 reciprocates through the arc about the axis A'. The arc of mirror movement lies in the plane of the drawing of FIG. 3.

When the laser diode and focusing module 600 emits a light beam, the moving mirror 159 reflects the beam toward a target surface on which an indicia 70' appears. The reciprocal vibration of the mirror 159 causes the beam to scan a line to the left of the support structure 100 shown in the drawing. If FIG. 3 is a side view and the support structure 200 is oriented as shown, the resultant scan line would be vertical and would scan an indicia 70' having horizontal bars. The light reflected back by the indicia passes back through an ambient light blocking optical filter 156 for application to the detector 158. The detector 158 produces an analog signal proportional to the intensity of the reflected light which is processed, digitized and decoded in the usual manner.

Figure 1:
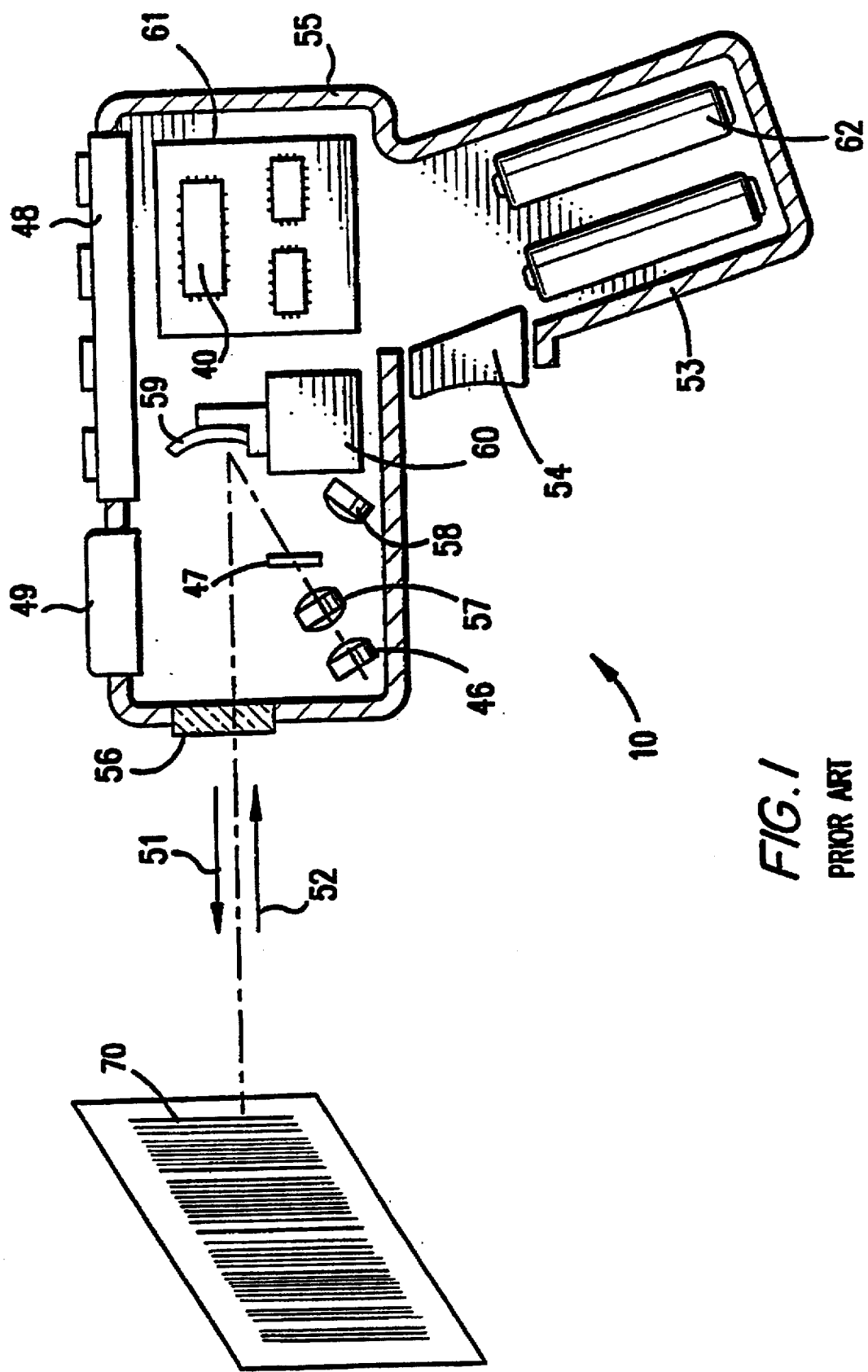
FIG. 1 illustrates a prior art handheld laser scanner and terminal device for scanning bar codes and inputting and displaying data.

As demonstrated by the two different layouts of the scanner motor discussed above, one advantage of the component support structure is that it can be oriented in a variety of different ways to produce scanning in different directions. For example, if the system of FIG. 2 is incorporated into a handheld scanner of the type shown in FIG. 1, the resultant scan line would scan horizontally across the bar code indicia 70. In contrast, if the system of FIG. 3 were incorporated into a handheld scanner of the type shown in FIG. 1, the resultant scan line would scan vertically. Such a scan would permit reading of a code 70' oriented so that the bars are horizontal.

The flexible support structure 100 or 200 in the above discussed embodiments provides a scanning component structure which can be quite small but can still operate at the low scanning frequencies preferred for bar code scanning, typically 20 Hz or less. The location of the mirror and magnets at opposite ends of the member 103 positions the weight thereof relatively far from the axis. Consequently, the moving components exhibit a high moment of inertia. Also, the mass of the moving components is fairly large; and the preferred materials of the spring strips 121, 123 (i.e., MYLAR(TM) and KAPTON(TM)) tend to be quite flexible. As a consequence of the high mass, high inertia and spring flexibility, the system has a relatively low characteristic frequency of vibration. The balancing of the weight of the mirror and the weight of the first magnet with respect to the pivot axis provides a precise scan motion without vibrations in any unwanted directions. If the components supported by the springs were not balanced, when the operator held the scanner so that the orientation of the axis was not precisely vertical, the weight of the effect of gravity of the components would move them out of position. As a result, the mirror would not be properly aligned with the fixed components, such as the laser diode and the window through which the beam exits the housing. The balancing of the moving parts also improves the efficiency of performance of the scanner.

FIGS. 4–8 show the construction of a small sized, self-contained, scanning module 400' in accordance with the present invention. The module 400' is substantially rectangular and in one example was made as small as 1.5"×1.5"× 0.8".

Figure 4:
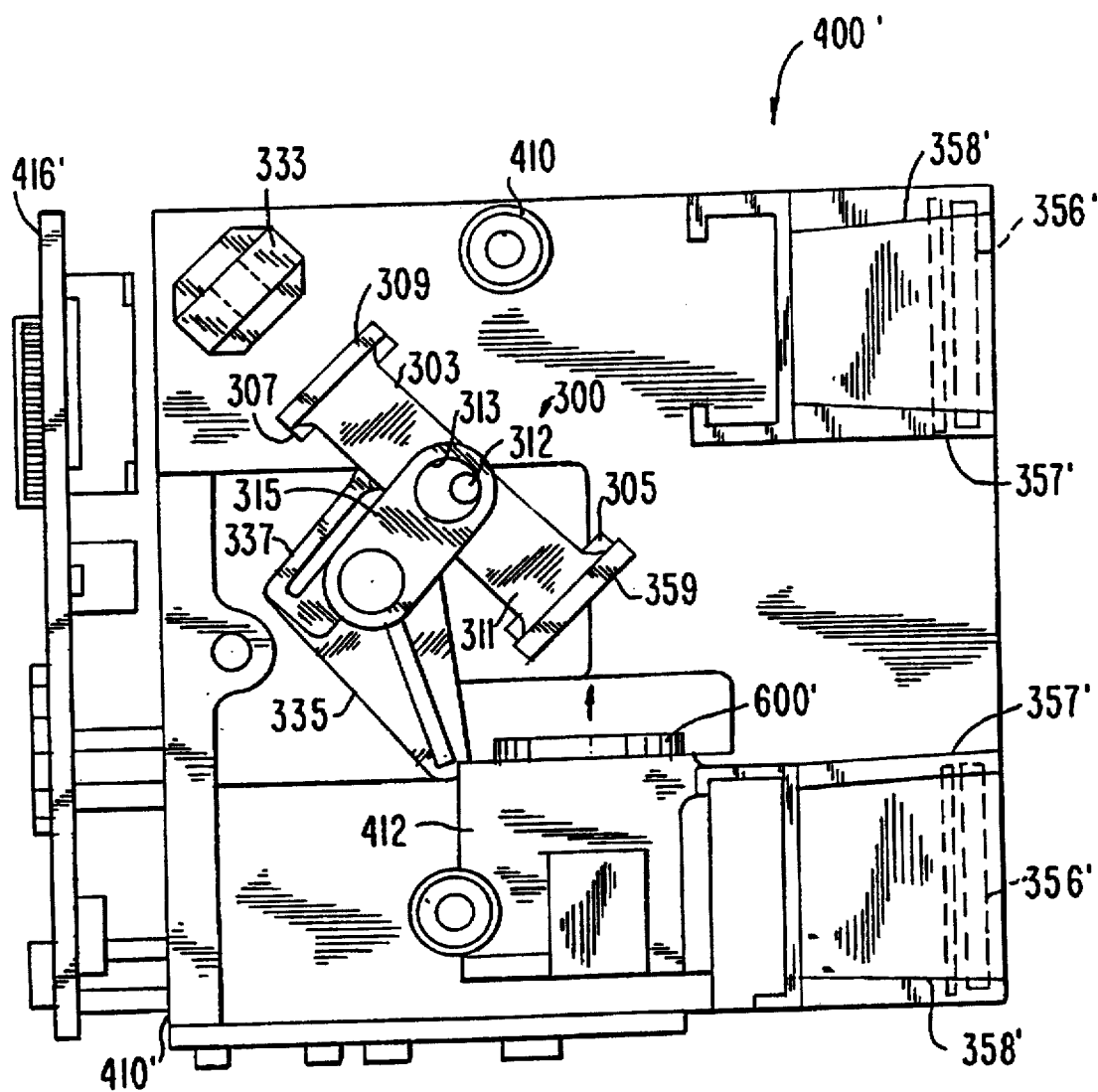
FIGS. 4–7 show top, right side, front and perspective views, respectively, of a scanner module having a scanner motor of the type depicted in FIGS. 2 and 3, in accordance with the present invention.
Figure 7:
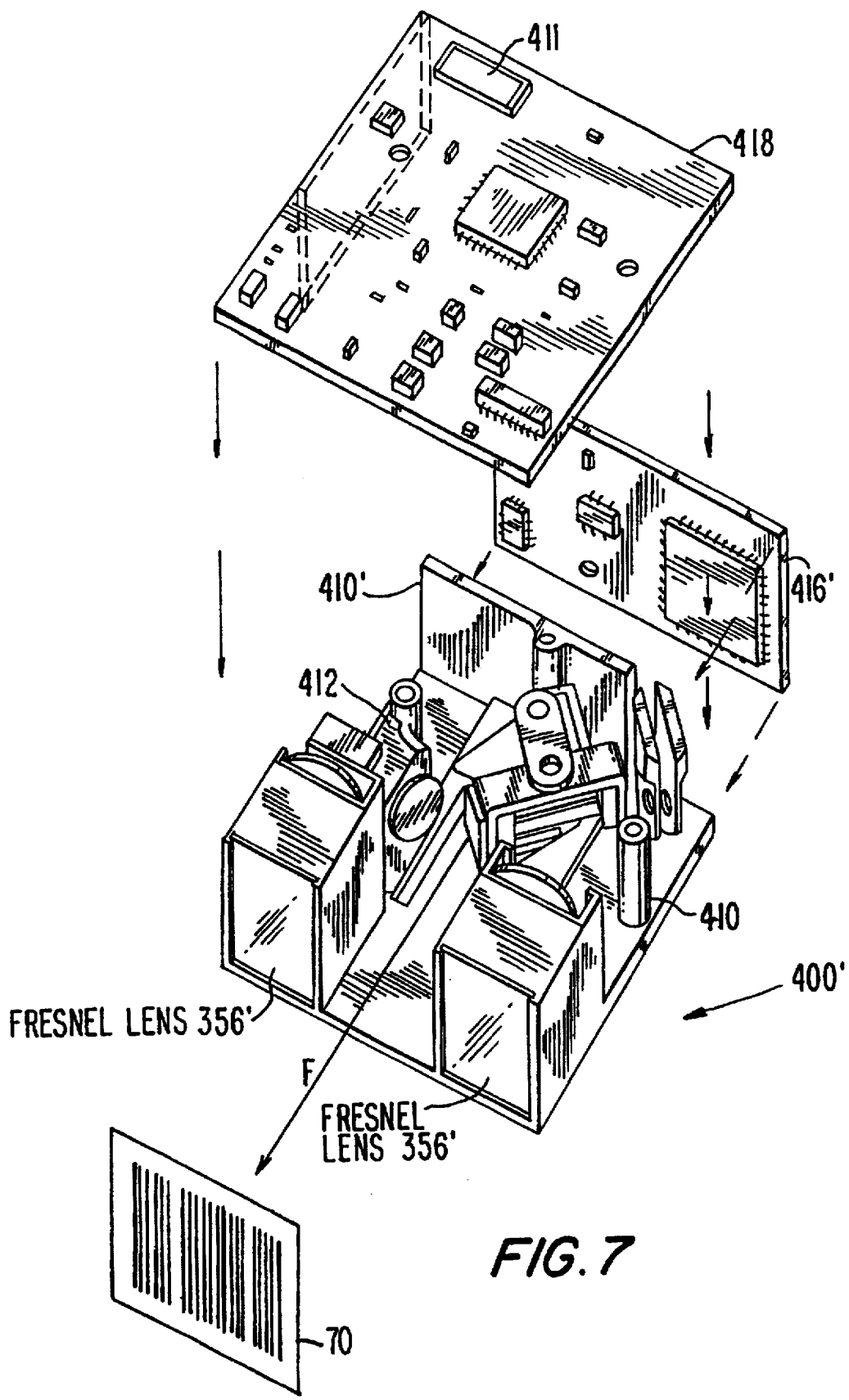

As shown in FIGS. 4 and 7, the module 400' includes a metal base 410, typically formed of aluminum. A circular housing 412 contains a laser diode and focusing module 600'. As shown, the circular housing 412 is integrally formed as a section of the metal base 410. The circular housing 412 serves as the holder of a laser diode and focusing module 600'. The laser diode is press fit into the circular opening of the housing 412, from the end which appears as the left end in FIG. 4. A second member, holding the lens, telescopes into the circular housing 412 from the opposite end. During focusing, the second member and lens are moved into the circular housing against the force of a biasing spring positioned between the laser diode and the lens. When proper focusing is achieved, the lens holder is fixed in position with respect to the laser diode and the circular housing 412, for example by injecting a glue. Because of the tight fit of the housing 412 about the laser diode and focusing module 600', the housing 412 and base 410 serve as a heat sink to dissipate heat generated by the laser diode during scanning operations.

Figure 5:
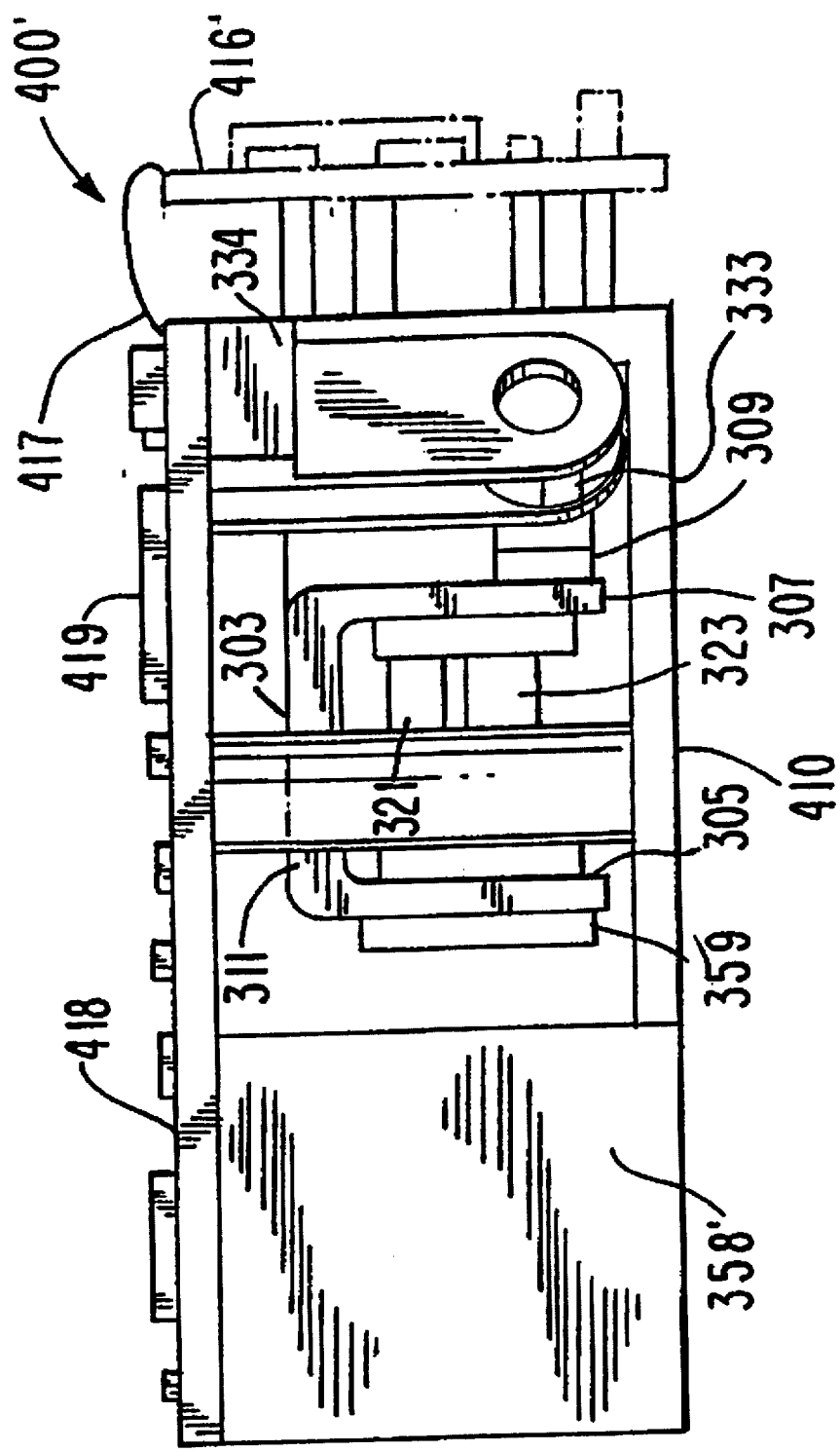

FIGS. 5 and 7 show that the module 400' includes two circuit boards positioned at right angles to each other. A first circuit board 416', mounted orthogonal to the metal base 410 and at one end thereof, supports part of the circuitry used by the scanner. Typically, the first circuit board 416' supports the circuitry for producing the current to drive the laser diode.

A second circuit board 418 is mounted orthogonal to the first circuit board and parallel to the metal base 410. With the flat major surface of the base 410 serving as the bottom of the module 400', the second circuit board would form the top of the module 400'. A flexible electrical cable 417 connects the circuitry on the first and second circuit boards together. The second circuit board 418 supports the remainder of the necessary circuitry. Of particular note, the board 418 supports an application specific integrated circuit 419 which includes the analog processing circuitry, digitizer and may include a microprocessor based decoder.

Referring again to FIG. 4, which illustrates the interior of the module with the second circuit board omitted, a support structure 300 provides flexible support for the mirror 359 so as to facilitate the necessary reciprocal motion of the mirror. The support structure 300 is essentially similar to the structures described above with respect to FIGS. 1 and 2.

As shown in FIG. 8, the mirror support structure 300 includes U-shaped member 303 having a first arm 305 to which the mirror 359 is attached. A second arm 307 of the member 303 supports the permanent magnet 309 and a straight section 311 extends between and connects the first and second arms together to form the U-shape of member 303.

A pair of flexible strips 321, 323 (see FIG. 5) connect to one of the arms of the U-shaped member 303 and serve as the planar spring. Again, these spring strips comprise a flat sheet of a flexible plastic material such as MYLAR(TM) or KAPTON(TM) film, or other flexible elements such as a flat strip of non-magnetic metal like a beryllium-copper alloy. When the arm 303 is in its rest position, the strips 321, 323 remain in a relatively unflexed state and extend in a direction substantially parallel to the straight section 311 in the space between the first arm 305 and the second arm 307 as shown in FIG. 8. The free ends of the strips 321, 323 connect to the first arm 305, and the opposite ends of the strips 321, 323 are held by a fixed support structure.

More specifically, and as shown in FIG. 8, the free end of the MYLAR(TM) or KAPTON(TM) material sheets forming the flexible strips 321, 323 are fastened by suitable fasteners 325 and thereby clamped between a plate 327 and a frame member 326 extending from the rear surface of first arm 305 and a portion of the lower surface of the straight section 311. The opposite ends of the strips 321, 323 are fastened to a fixed support structure by suitable fasteners 329 which clamp the strips between a plate 331 and an enlarged portion of a stationary arm 337 extending out from the support pedestal 335 (see also FIGS. 4 and 7). The support pedestal 335 is mounted on the flat section of the metal base 410.

The components of the support structure 300, the mirror 359 and the magnet 309 are dimensioned such that the weight of the magnet balances the weight of the mirror with respect to an axis A" approximately half way between the mirror and the magnet. As a result, the strips 321, 323 function as planar leaf spring elements and flex about pivotal axis A". The pivot axis A" extends perpendicular to the flat lower portion of the base 410, or vertical in FIG. 8.

Referring again to FIG. 4, an electromagnet 333 is attached to the lower surface of the second circuit board 418 by a bracket 334 (FIG. 5). Mounting of the second circuit board 418 on the top of the module 400' positions the attached coil 333 in close proximity to the permanent magnet 309. The axis between the north and south poles of the permanent magnet 309 is parallel to the flat lower portion of the metal base 410. When the alternating current is introduced through the coil of the electromagnet 333, interaction between magnetic fields of the coil and the permanent magnet 309 produce an oscillatory movement of the permanent magnet 309 and a rotational oscillation of the attached member 303 against the return forces produced by the flat planar spring strips 321, 323. The flexible strips 321, 323 twist back and forth about the axis A" causing the member 303 to vibrate, and the mirror 359 reciprocates through the arc about the axis A".

Figure 6:
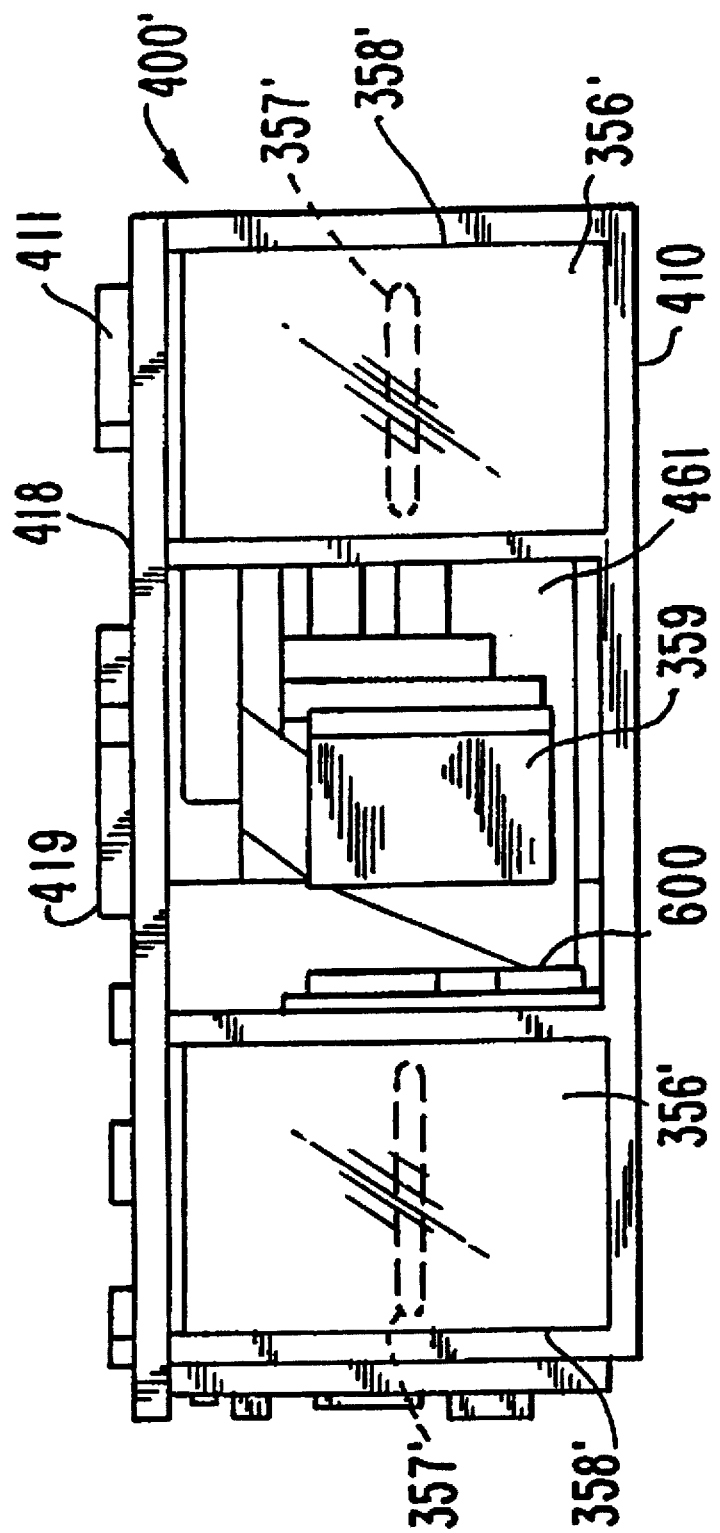

When the laser diode and focusing module 600' emits a light beam, the moving mirror 359 reflects the beam toward a target surface on which an indicia appears. When viewed from above, as in FIG. 4, the mirror 359 reflects the light beam to the right and towards a front end of the module 400', i.e. towards the bottom of FIG. 4. The beam emerges through an opening 461 formed in the front side of the module which is shown in FIG. 6 (see also FIG. 7). Specifically, the opening 461 is formed between the two optical detectors 358' which are supported on the metal base 410. The reciprocal vibration of the mirror 359, during emission of the beam from the laser diode and focusing module 600', causes the beam to scan a line through the opening 461. In particular, the scan line would have a longitudinal direction extending between the two optical detectors 358' and in a plane substantially parallel to the bottom of the base 410.

If module 400 is horizontally mounted in a scanner as shown, the resultant scan line would be horizontal and would scan an indicia having vertical bars. In contrast, if the module 400 is mounted vertically in a scanner, as if FIG. 4 were a side view, the resultant scan line would be vertical and would scan an indicia having horizontal bars.

The light reflected back by the indicia passes back through optical lenses 356' which focus respective portions of light, from the laser diode 412, which is reflected or scattered off the indicia for application through apertures 357' to the respective detectors 358' (FIGS. 4 and 6). The lenses 356' are preferably, although not necessarily limited to, Fresnel lenses. Fresnel lenses and their operation are well known to those skilled in the art. The aperture is a thin slit aperture which has a longitudinal or elongated dimension, parallel to the longitudinal or elongated dimension of the scan line, and a dimension perpendicular thereto which is substantially smaller than the longitudinal or elongated dimension. Although the dimensions may vary depending upon the particular application, with a longitudinal dimension of say 0.25", an appropriate second dimension of the thin slit aperture would be of 0.030" to 0.060" depending on the particular application. By utilizing a multiple detector system which includes lenses 356' operating in conjunction with thin slit apertures 357' located between each lens 356' and its associated detector 358', noise can be eliminated or significantly reduced. This results in improved scanning capability. In particular, by utilizing this arrangement the scanner is capable of reading high density symbols with bar/space widths of 5.5 to 7.5 mils at distances ranging from 6.5 to 12.75. Further, the arrangement also facilitates usage of the scanner at distances ranging from 12.75 to 68 inches to read lower density symbols with bar/space widths of 10 mils or more. The detectors 358' each preferably include one long photodiode, but could, if desired, have a linear array of photodiodes. Because only a portion of the reflected light from the indicia is gathered and focussed onto each detector 358' by a lens 356' and aperture 357' assembly, detectors 358' can image upon light of sufficient intensity, i.e. having a sufficient signal to noise ratio, to enable the scanner to successfully perform satisfactorily mid-range and long-range operations. As shown in FIGS. 6 and 7, the lenses 356', apertures 357' and the detectors 358' extend from the inner surface of the base 410 to the inner surface of circuit board 418 which forms the top of the module 400' and thereby form the top and bottom of the opening 461. The detectors 358', apertures 357' and the lenses 356' are arranged to be substantially orthogonal to circuit board 418 and to the flat major surface at the bottom of the metal base 410.

As shown, base 410 supports the lenses 356', apertures 357' and detectors 358'. When assembled, the detectors 358' project toward the front of the module from a position behind the lenses 356' and apertures 357'. Each of the detectors 358' produces an analog signal proportional to the intensity of the reflected light from a portion of the indicia. More specifically, each of the two assemblies of lenses 356' and apertures 357' is arranged to gather and focus reflected light from only that portion of the indicia which is scanned by a scan line produced by the scanning light beam and directed by mirror 359.

FIGS. 9A and 9B show the inter-relation of the two detection assemblies in operation. As depicted, with the scan line centered on the indicia, each lens 356' will gather and focus reflected light from a respective portion of the indicia through the associated aperture 357' onto the associated detector 358'. Thus, each of the detectors 358' will detect or image reflected light intensities from a respective portion of the indicia and generate an analog signal indicative of that portion of the indicia. The detectors 358' image the reflected light simultaneously. The analog signals are accordingly generated and transmitted simultaneously by the respective detectors 358'. The analog signals are preferably summed linearly in amplification circuitry 411 disposed on circuit board 418. Alternatively, an analog stitching algorithm could be implemented by circuitry disposed on the circuit board 418. This circuitry linearly stitches the respective analog signals together prior to transmission to conventional amplification circuitry also disposed on circuit board 418. In either case, the amplified signal is then digitized, processed, and may be decoded by the application specific integrated circuit 419. Electrical leads carry signals from the diodes of the detectors 358' to the stitching circuity.

If the scan line is not centered on the indicia, each respective lens 356', aperture 357' and detector 358' assembly will operate to detect that respective portion of the indicia which reflects the light from a respective portion of the scan line. Thus, for example, if the scan line is centered to the right of the centerline of the indicia, which in the plane of the indicia is perpendicular to the scan line, the left detector, looking from the rear towards the front of the scan module, will detect reflected light representing a larger portion of the indicia than the right detector. Since the summing or stitching of the analog signals is linear, it is unaffected by such off-centered operation. Correspondingly, if the scan line is centered to the left of a centerline of the indicia, which in the plane of the indicia is perpendicular to the scan line, the right detector, looking from the rear of the scan module, will detect reflected light representing a larger portion of the indicia than the left detector. It should also be understood that, if desired, the respective portions of indicia which each of the lens/aperture/photodetector assemblies detects, when the scan line is centered on the indicia, could be varied.

It should also be noted that each of the detector assemblies has a field of view as shown in FIGS. 9A and 9B. As shown in FIG. 9A, in the preferred embodiment, the detector assemblies will have a "dead zone" which occurs within approximately 2 to 2½ inches from the outer surface of each lens. Within this range, the fields of view of the two detector assemblies will be non-overlapping. Thus, indicia located within this range are outside the operational range of the module. As the distance between the outer surface of the lenses 356' and the indicia increase beyond the dead zone range, the fields of view of the detector assemblies will overlap to some extent. The further the indicia is disposed from the lens surfaces, the greater the overlap of the fields of view. As depicted in FIG. 9A, the dead zone occurs within a distance of less than dimension a from the outer surface of lenses 356'. As the distance separating the indicia from the module increases to dimension b and overlapping of the fields of view of the detectors, in an amount reflected by dimension c, occurs. As will be understood by those skilled in the art, this overlap results in a more uniform signal being detected from the different portions of the indicia being scanned. In particular, the intensity of the reflected light detected at the ends of the field of view is typically less than that which is detected at the center of the field of view. Thus, by overlapping the ends of the respective fields of view, the intensity of the reflected light detected by each of the scanners, when combined linearly, will be enhanced. Accordingly, the overlap will result in a more homogeneous signal being detected across the full length of indicia being scanned. Because the summing or stitching of the analog signal is linear, it is unaffected by the overlap of the fields of view.

Returning to FIG. 4, the U-shaped member 303 also has a pin 312 extending upward from the straight section 311, as shown. The pedestal 335 has a cap plate 315 attached at the top of the pedestal. The cap plate 315 extends over the U-shaped member 303 such that the pin 312 is located in an opening 313 formed in the cap plate 315. The opening 313 is somewhat larger than the pin 312. As a result, the inner surface of the opening does not engage the pin 312, and the pin and opening do not act as a pivot point during normal scanning operations. The opening 313 does, however, serve to limit lateral motion of the pin 312 and the attached arm 303. Together the pin and opening serve as a stop to limit displacement of the scanning component. As a result, if the scanning module 400' is dropped or otherwise subjected to a shock, the weight of the mirror and magnet do not force the springs 321 and 323 to bend to such an extreme degree in any lateral direction as to cause permanent deformation or other damage to those springs.

The small size of the flexible support structure 300 provided in the scanning module does not prevent operation at low scanning frequencies. Again, the location of the mirror and magnet at opposite ends of the member 303 positions the weight thereof relatively far from the axis thereby providing a high moment of inertia. Also, the mass of the moving components is fairly large; and the preferred materials of the springs 321, 323 tend to be quite flexible. The high mass, high inertia and spring flexibility, cause the flexible support structure to exhibit a relatively low characteristic frequency of vibration. Thus the small self-contained scanning module 400 operates at the low scanning frequencies preferred for bar code scanning, such as 20 Hz or less. Also, the module 400' incorporates the balancing of the weight of the mirror and the weight of the first magnet. This reduces or eliminates undesirable vibrations which might disrupt the scanning motion and minimizes the amount of power which must be applied to initiate motion of the scanning component, making the scanner more efficient.

Because of the small size, light weight and robust construction of the scanner modules incorporating the flexible support structures of the present invention, the scanner of the present invention can be mounted, worn or held by an operator in a wide range of positions. For example, scan module 400' shown in FIGS. 4 to 7, could be mounted so that the operator could wear the module on a helmet, eye glasses, an arm band, bracelet or perhaps even a ring, etc. The module could easily fit in a handheld scanner similar to that shown in FIG. 1. Alternatively, the module could be part of a fixed installation scanner.

In one preferred embodiment, shown in FIGS. 10 and 11, scan module 400' is incorporated into a terminal 750 having a keyboard or keypad and a display, assembly 775 or alternatively a touchscreen display, which allows an operator to input data and to view data which is generated by the scanner, e.g. decoded information corresponding to scanned indicia, or data which is transmitted to the terminal, for example by a cable or wireless communications link. The terminal may also include any desired additional processing circuitry, and a storage device for storing information corresponding to scanned indicia. A rechargeable power source (not shown), is also a component of the terminal. The terminal may also include a wireless transmitter. The transmitter could be a radio transmitter, an infrared transmitter, an ultrasonic transmitter or any other type wireless transmitter. The transmitter would send analog or digital signals resulting from the scan of the indicia 70 to an associated electronic processing or storage system.

With reference to FIG. 10, the terminal 750 includes a tablet shaped housing 751 having a bottom end 752, an enlarged section at a top end opposite the bottom end, and an elongated body between the ends. The scanner module 400' is mounted at one end of a circuit board 753 to position the module in the enlarged top section of the housing 751. The circuit board 753 could also support any additional circuitry for generating or processing signals related either to the scanning operation or input/display operations of the terminal, as needed. A light-transmissive window 756 allows the outgoing light beam from the beam scanner module 400' to exit the housing 751. The beam of light travels along a light path extending away from the outer surface of the body of the housing 751 toward a target surface on which optically encoded indicia 70 appears.

The light reflected back by the indicia passes back through a window 756 for application to the detector assembly. The detector produces an analog signal proportional to the intensity of the reflected light. The circuitry in module 400' or, if desired, with circuitry mounted on circuit board 753 stitches together the analog signals, amplifies the combined signal and then processes and decodes the signal in the usual manner.

A manually actuable switch 754 is mounted on a side surface of the body of the terminal. Consequently, the switch is out of line of the light path. An operator holding the terminal in his/her left hand would actuate the switch with a left forefinger. The switch could of course be relocated to the other side of or elsewhere on the housing if preferred, so long as operation of the switch does not interfere with the emission and detection of light passing through window 756. In any case, because of the position of the switch can be easily located in a large number of positions without obstructing the path of the light beam. Operation of the switch activates the beam emission and scanning components of the module 400' and associated signal processing and decoding circuitry to initiate reading of the optically encoded indicia 70.

As shown in FIG. 11, the terminal optionally includes a cable 757. The input device is sensitive to contact of the user's finger at positions on the tablet to derive positional data, and the screen displays information related to the derived positional data. For example, a touchscreen may include a resistive contact type input screen, for electronically determining an X,Y position at which the user's finger contacts the display surface, and an associated display device, such as those disclosed in U.S. Pat. No. 4,972,496. Alternatively, the terminal electronics could rely on other technology, such as pressure sensitive contact detection circuitry, etc. In each case, the key feature is that the terminal 750 incorporates both the electronics necessary to provide X,Y position data input to the corresponding type of input device 775 and a beam scanner module 400' of the type discussed herein.

In FIG. 11, the optional cable 757 carries the digital data representing, for example, the decoded characters of the scanned indicia, to the associated computer. If cable 757 is provided, the terminal 750 typically receives a power supply voltage from an external source, such as the system power supply, via the cable 757 connection to the terminal 750 rather than the local power supply within the terminal housing as described above. If a wireless transmitter is provided, the cable connection to the terminal 750 would be unnecessary for transmitting data to an associated computer.

Thus, as described, the optical scanning device of the present invention is a miniaturized bar code reader with a scan unit of reduced size and weight which provides a particularly convenient scanner system. The mass of the components are low so that the power required to produce the scanning movement is minimized and operation at appropriate scanning speeds is facilitated. An entirely self-contained scanning module is provided which includes all components necessary to generate the light beam, scan the beam across an indicia, detect light reflected back by the indicia and process signals representative of the reflected light. The scanning module is small, light weight and easy to incorporate into a variety of different types of optical scanners and optical scanning systems. The scanner described is capable of scanning high density indicia at mid-range and low density indicia at long-range.

Although the invention has been discussed with reference to certain scanner housings, triggering mechanisms and other features of conventional scanners, it will be understood that a variety of housing styles and shapes and triggering mechanisms could be used. Other conventional features can also be included if so desired. The invention is directed primarily to a portable hand-held scanning device, and thus is preferably implemented using miniaturized components such as those described herein or in the materials referenced herein, or otherwise known in the art. However, the scanner of the present invention is not limited to use in portable devices and can also be easily adapted for use in a stationary housing or so called tunnel scanning systems wherein the item on which the symbol resides is moved across the scanner head.

Additionally, even though the present invention has been described with respect to reading one dimensional bar codes, it is not limited to such embodiments, but may also be applicable to more complex indicia scanning or data acquisition applications such as two dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

The elements of the scanner may be implemented in a very compact assembly or package such as a single integral module. Such a module can interchangeably be used as the dedicated scanning element for a variety of different operating modalities and types of data acquisition systems. For example, the module may be alternately used in a hand-held manner, in a table top goose neck scanner attached to a flexible arm or mounting extending over the surface of the table or attached to the underside of the table top, or as a subcomponent or subassembly of a more sophisticated data acquisition system such as a tunnel scanner system.

Each of these different implementations is associated with a different modality of reading bar code or other symbols. Thus, for example, the hand-held scanner is typically operated by the user "aiming" the scanner at the target; the table top scanner operated while the target is moved rapidly through the scan field, or "presented" to a scan pattern which is imaged on a background surface. Still other modalities within the scope of the present invention envision the articles being moved past a plurality of scan modules oriented in different directions so the field of view allows at least one scan of a symbol which may be arbitrarily positioned on the article.

The module could advantageously comprise various optic subassemblies mounted on a support, and photodetection components, such as a photodiode, charge coupled or solid state imaging device. Control or data lines associated with such components may be connected to an electrical connector mounted on the edge or external surface of the module to enable the module to be electrically connected to a mating connector associated with other elements of the data acquisition system.

An individual module may have specific scanning or decoding characteristics associated with it, e.g. operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local or wide area network or with the telephone exchange network, either through a modem or an ISDN interface, or by low power radio broadcast from a portable terminal to a stationary or mobile receiver.

It will be understood that each of the features described above, or two or more together, may find a useful application in other types of scanners and readers differing from the types described above.

As described above, an improved scanning arrangement without the limitations of prior art readers is provided. The novel features and characteristics of the invention are set forth in the appended claims. The invention itself, however, as well as other features and advantages thereof, will be best understood by reference to the detailed description, when read in conjunction with the accompanying drawings.

We claim:

1. A terminal for reading indicia having portions of different light reflectivity, comprising:
   a) a hand-held housing having a window;
   b) a scan module within the housing for electro-optically scanning the indicia through the window, said scan module including
      i) a base,
      ii) a first circuit board mounted generally orthogonal to the base and at one end of the base,
      iii) a first circuit mounted on the first circuit board,
      iv) a second circuit board mounted generally orthogonal to the first circuit board and parallel to the base, and
      v) a second circuit mounted on the second circuit board, and electrically connected to the first circuit;
   c) an initiator on the housing for initiating the scanning of the indicia;
   d) a keyboard on the housing for manually entering information to the scan module; and
   e) a display on the housing for displaying data.

2. The terminal according to claim 1, wherein the module includes a scanning component, and an oscillator for oscillating the scanning component.

3. The terminal according to claim 2, wherein the oscillator includes first and second magnets, one of which is a permanent magnet and the other of which is an electromagnet to which an alternating drive signal is applied.

4. The terminal according to claim 2; and further comprising flexible planar springs for mounting the scanning component for oscillation.

5. The terminal according to claim 1, wherein the module includes a light source for emitting a light beam for reflection from the indicia, and a detector for detecting light reflected from the indicia.

6. The terminal according to claim 5, wherein the first circuit includes a drive circuit for producing a signal to drive the light source.

7. The terminal according to claim 5, wherein the second circuit includes an application specific integrated circuit for producing signals to drive the light source and for processing electrical signals produced by the detector.

8. The terminal according to claim 5, wherein said detector is stationarily mounted on the base.

9. The terminal according to claim 5; and further comprising an electrical cable connecting the first and second circuits to each other, wherein the first and second circuits operate together to drive the source and to process electrical signals produced by the detector.

10. The terminal according to claim 1, wherein (i) said indicia has bar/space widths in the range of 5.5 to 7.5 mils and is scanned from a distance of 6.6 to 12.75 inches or (ii) said indicia has bar/space widths of over 10 mils and is scanned from a distance of 12.75 to 68 inches.

11. The terminal according to claim 1, wherein the housing has an enlarged head portion in which the scan module is accommodated.

12. The terminal according to claim 1, wherein the initiator is a manually actuatable trigger mounted at a side of the housing.

13. The terminal according to claim 1, wherein the keyboard and the display are combined in a touch screen.

14. The terminal according to claim 11, wherein the housing has a generally parallelepiped main portion adjacent the head portion, and wherein the keyboard is located on the main portion.

* * * * *